United States Patent
Lee et al.

(10) Patent No.: US 8,942,293 B2
(45) Date of Patent: Jan. 27, 2015

(54) PICTURE-IN-PICTURE PROCESSING FOR VIDEO TELEPHONY

(75) Inventors: Yen-Chi Lee, San Diego, CA (US);
Khaled Helmi El-Maleh, San Diego, CA (US); Ming-Chang Tsai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 13/290,060

(22) Filed: Nov. 5, 2011

(65) Prior Publication Data

US 2013/0033564 A1 Feb. 7, 2013

Related U.S. Application Data

(62) Division of application No. 11/208,176, filed on Aug. 19, 2005, now Pat. No. 8,081,684.

(51) Int. Cl.
*H04N 7/12* (2006.01)
*H04N 7/14* (2006.01)

(52) U.S. Cl.
CPC .......... *H04N 7/147* (2013.01); *H04N 2007/145* (2013.01)
USPC ............ 375/240.26; 375/240.24; 375/240.25; 375/240.01; 382/235; 382/233; 382/239; 382/232

(58) Field of Classification Search
USPC ............. 375/240.26, 240.24, 240.25, 240.01; 382/235, 233, 239, 232
See application file for complete search history.

(56) References Cited

U.S. PATENT DOCUMENTS

| | | | |
|---|---|---|---|
| 5,734,415 A * | 3/1998 | Hwang | 348/14.01 |
| 5,920,359 A | 7/1999 | Curley et al. | |
| 6,111,605 A | 8/2000 | Suzuki | |
| 6,249,547 B1 * | 6/2001 | Boyce et al. | 375/240.15 |
| 6,481,012 B1 * | 11/2002 | Gordon et al. | 725/54 |
| 7,020,207 B1 | 3/2006 | Tavares | |
| 8,081,684 B2 * | 12/2011 | Lee et al. | 375/240.26 |
| 2004/0150748 A1 * | 8/2004 | Phillips et al. | 348/565 |
| 2005/0053288 A1 * | 3/2005 | Srinivasan et al. | 382/233 |
| 2012/0050452 A1 | 3/2012 | Lee et al. | |
| 2012/0287221 A1 | 11/2012 | Lee et al. | |

FOREIGN PATENT DOCUMENTS

| | | |
|---|---|---|
| DE | 19934507 | 2/2001 |
| JP | 4159890 A | 6/1992 |
| JP | H07203436 A | 8/1995 |

(Continued)

OTHER PUBLICATIONS

International Search Report and Written Opinion—PCT/US2006/032657, International Search Authority—European Patent Office—Jun. 2, 2007.

*Primary Examiner* — Shawn An
(74) *Attorney, Agent, or Firm* — Kevin T. Cheatham; Elaine H. Lo

(57) ABSTRACT

The disclosure is directed to techniques for picture-in-picture (PIP) processing for video telephony (VT). According to the disclosed techniques, a local video communication device transmits PIP information to a remote video communication device. Using the PIP information, the remote video communication device applies preferential encoding to non-PIP regions of video transmitted to the local video communication device.

38 Claims, 7 Drawing Sheets

(56) References Cited

FOREIGN PATENT DOCUMENTS

| | | |
|---|---|---|
| JP | H0884329 A | 3/1996 |
| JP | H09130734 A | 5/1997 |
| JP | 10336662 A | 12/1998 |
| JP | 2001045476 A | 2/2001 |
| JP | 2002111610 A | 4/2002 |
| JP | 2003111040 A | 4/2003 |
| JP | 2003189286 A | 7/2003 |
| JP | 2003523103 T | 7/2003 |
| KR | 100215620 | 8/1999 |
| WO | 0016544 A2 | 3/2000 |
| WO | 0131914 A1 | 5/2001 |

* cited by examiner

PICTURE-IN-PICTURE PROCESSING FOR VIDEO TELEPHONY

CROSS-REFERENCE TO RELATED APPLICATION

The present Application for Patent is a divisional of patent application Ser. No. 11/208,176, entitled "PICTURE-IN-PICTURE PROCESSING FOR VIDEO TELEPHONY" filed Aug. 19, 2005, pending, which is assigned to the assignee hereof and hereby expressly incorporated by reference herein.

TECHNICAL FIELD

The disclosure relates to digital video encoding and decoding and, more particularly, techniques for processing information for video telephony (VT) applications involving picture-in-picture (PIP) presentation.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner.

Video telephony (VT) permits users to share video and audio information to support applications such as videoconferencing. Exemplary video telephony standards include those defined by the Session Initiated Protocol (SIP), the ITU H.323 standard, and the ITU H.324 standard. In two-way VT, users send and receive video information. Some VT systems provide a picture-in-picture (PIP) feature that permits a user to view both incoming video from a remote user and outgoing video sent to a remote user.

With the PIP feature, outgoing video may be presented in a smaller picture overlaid on a larger picture containing the incoming video. The larger picture typically occupies an entire video frame. The smaller picture may occupy approximately twenty to twenty-five percent of the video frame, covering a portion of the larger picture. The PIP feature may permit the user to view outgoing video to ensure proper camera alignment. For example, a user may wish to ensure that his face, or another object, will be fully visible within the outgoing video frame. Using the PIP feature, the user can better position the camera to improve the content of the outgoing video.

SUMMARY

The disclosure is directed to techniques for picture-in-picture (PIP) processing for video telephony (VT). According to the disclosed techniques, a local video communication device transmits PIP information to a remote video communication device. Using the PIP information, the remote video communication device applies preferential encoding to non-PIP regions of video transmitted to the local video communication device.

When the PIP feature is enabled, the local video communication device presents a video frame containing incoming video received from the remote video communication device and outgoing video transmitted to the remote video communication device. The incoming video occupies substantially the entire video frame. The outgoing video occupies a smaller region of the video frame, which is referred to as the PIP region. The local video communication device transmits PIP information to the remote video communication device.

The PIP information identifies the PIP region in which the outgoing video will be presented to the user of the local video communication device. The PIP information may be embedded within encoded outgoing video, or transmitted by out-of-band signaling techniques. In some embodiments, PIP content and PIP information may be provided from an intermediate network server.

Using the PIP information, the remote video communication device preferentially encodes areas of the incoming video that are outside the PIP region. The remote video communication device may encode areas of the incoming video that are inside the PIP region with lower quality. Alternatively, the remote video communication device may skip encoding of the areas of the incoming video that are inside the PIP region. In either case, transmission of PIP information from the local video communication device to the remote video communication device permits the non-PIP regions of the incoming video to be encoded with enhanced visual quality.

The exchange of PIP information makes the remote video communication device aware of the PIP specified by the local video communication device. In this sense, a video communication device incorporates a "PIP-aware" video encoder-decoder (CODEC) that is capable of processing remotely specified PIP information from another video communication device, and encodes outgoing video based on the PIP information. In some embodiments, a video communication device also may preferentially decode non-PIP regions of incoming video based on locally specified PIP information, e.g., by skipping or applying lower complexity error concealment or post-processing in PIP regions.

In one embodiment, the disclosure provides a method comprising receiving picture-in-picture (PIP) information, and encoding video to be transmitted to a remote video communication device based on the PIP information.

In another embodiment, the disclosure provides a method comprising encoding video to be transmitted to a remote video communication device, and transmitting the video and picture-in-picture (PIP) information to the remote video communication device.

In an additional embodiment, the disclosure provides a video communication device comprising a module that receives picture-in-picture (PIP) information, and a video encoder that encodes video to be transmitted to a remote video communication device based on the PIP information.

In a further embodiment, the disclosure provides a video communication device comprising an encoder that encodes video to be transmitted to a remote video communication device, and a signaling module that sends picture-in-picture (PIP) information to the remote video communication device.

In another embodiment, the disclosure provides a video communication system comprising a local video communication device, and a remote video communication device, wherein the remote video communication device transmits remote picture-in-picture (PIP) information to the local video communication device, and the local video communication device encodes video for transmission to the remote video communication device based on the remote PIP information.

The techniques described herein may be implemented in hardware, software, firmware, or any combination thereof. If implemented in software, the techniques may be realized in part by a computer readable medium comprising program code containing instructions that, when executed by a processor, performs one or more of the methods described herein.

The details of one or more embodiments are set forth in the accompanying drawings and the description below. Other features, objects, and advantages will be apparent from the description and drawings, and from the claims.

DETAILED DESCRIPTION

Figure 1:
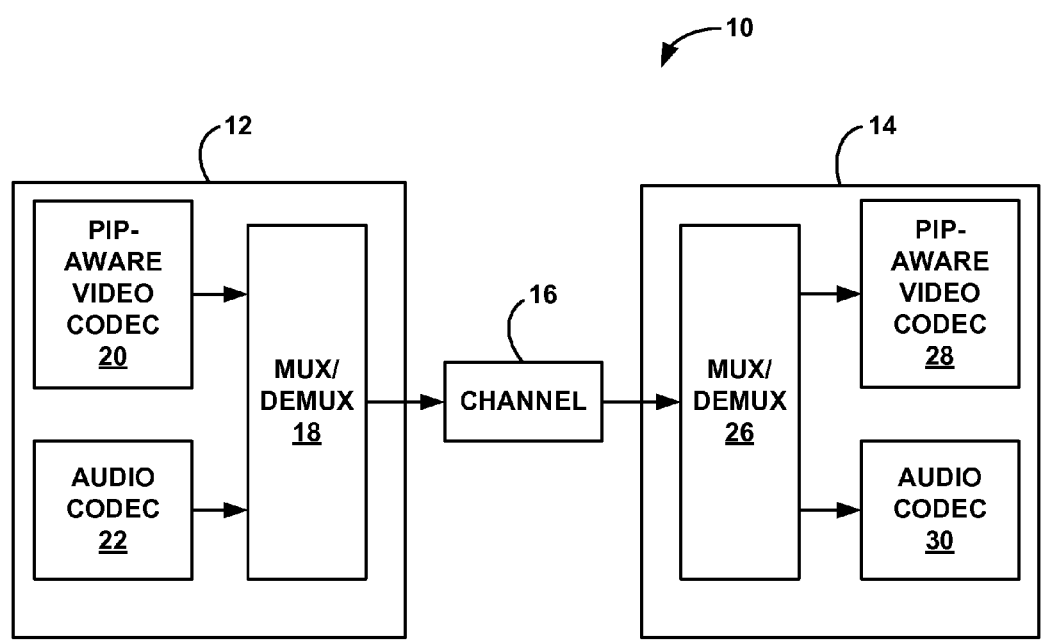
FIG. 1 is a block diagram illustrating a video encoding and decoding system incorporating PIP-aware video encoder-decoders (CODECs).

FIG. 1 is a block diagram illustrating a video encoding and decoding system 10 incorporating PIP-aware video encoder-decoders (CODECs). As will be described, system 10 may enhance video quality when a PIP feature is used in video telephony (VT). System 10 addresses the problem of encoding a video frame when a portion of the video frame is overlaid with a PIP region, which may be a smaller local preview window, when viewed on a remote display.

As shown in FIG. 1, system 10 includes a first video communication device 12 and a second video communication device 14. Communication devices 12, 14 are connected by a transmission channel 16. Transmission channel 16 may be a wired or wireless medium. System 10 supports two-way audio and video transmission between video communication devices 12, 14 for video telephony. Devices 12, 14 may operate in a substantially symmetrical manner. Reciprocal encoding, decoding, multiplexing (MUX) and demultiplexing (DE-MUX) components may be provided on opposite ends of channel 16.

In the example of FIG. 1, video communication device 12 includes MUX/DEMUX component 18, PIP-aware video CODEC 20 and audio CODEC 22. Similarly, video communication device 14 includes MUX/DEMUX component 26, PIP-aware video CODEC 28 and audio CODEC 30. Each CODEC 20, 28 is "PIP-aware" in the sense that it is capable of processing PIP information provided remotely from another video communication device 12, 14, or from an intermediate server. In this manner, each CODEC 20, 28 encodes a video frame by taking PIP frame overlay at a recipient device into account to improve video quality of the visible region of the video frame. In some embodiments, a CODEC 20, 28 also may be responsive to PIP information specified locally within its own video communication device, or PIP information provided by an intermediate server.

Video communication devices 12, 14 may be implemented as wireless mobile terminals or wired terminals equipped for video streaming, video telephony, or both. To that end, video communication devices 12, 14 may further include appropriate transmit, receive, modem, and processing electronics to support wireless communication. Examples of wireless mobile terminals include mobile radio telephones, mobile personal digital assistants (PDAs), mobile computers, or other mobile devices equipped with wireless communication capabilities and video encoding and/or decoding capabilities. Examples of wired terminals include desktop computers, video telephones, network appliances, set-top boxes, interactive televisions, or the like. Either video communication device 12, 14 may be configured to send video information, receive video information, or send and receive video information, as well as audio information.

According to the disclosed techniques, a local video communication device 12 presents a video frame containing incoming video received from a remote video communication device 14 and outgoing video transmitted to the remote video communication device. The incoming video occupies substantially the entire video frame. The outgoing video occupies a smaller region of the locally presented video frame. This smaller region is referred to as the PIP region. Local video communication device 12 transmits PIP information to remote video communication device 14. The PIP information indicates that the user of local video communication device 12 has activated the PIP feature. With this indication, remote video communication device 14 may assume a default position and size for the PIP region that will be viewed by the user of local video communication device 12. Alternatively, if the characteristics of the PIP region are variable, the PIP information also may identify the PIP region in which the outgoing video will be presented to the user of local video communication device 12, e.g., in terms of position and size. The PIP information may be embedded within encoded outgoing video, or transmitted by out-of-band signaling techniques.

Using the PIP information, remote video communication device 14 preferentially encodes areas of the incoming video that are outside the PIP region. The PIP region is the region in which the outgoing video will be presented as PIP content. The remote video communication device 14 may encode areas of the incoming video that are inside the PIP region with lower quality. Alternatively, because the incoming video will typically be completely obscured in the PIP region, the remote video communication device 14 more preferably skips encoding of the areas of the incoming video that are inside the PIP region. In either case, transmission of PIP information from local video communication device 12 to remote video communication device 14 permits the non-PIP regions of the incoming video to be encoded with enhanced quality.

The exchange of PIP information makes the remote video communication device 14 aware of the PIP specified by local video communication device 12. In this sense, remote video communication device 14 incorporates a "PIP-aware" video encoder-decoder (CODEC) that is capable of processing remotely specified PIP information from video communication device 12, and encodes outgoing video based on the PIP information. Local video communication device 12 may include reciprocal functionality. In some embodiments, a video communication device 12, 14 also may preferentially decode a non-PIP region of incoming video based on locally specified PIP information, e.g., by skipping or applying lower complexity error concealment or post-processing of incoming video in a PIP region.

PIP information transmitted by local video communication device 12 may specify coordinates within a video frame. The coordinates may define the boundaries of the PIP region in which outgoing video will be presented. The coordinates of the PIP region may be x-y coordinates within a video frame. However, the x-y coordinates may be processed to produce a PIP map. In particular, the coordinates may be presented in the form of a video block map, such as a PIP macroblock (MB) map. The MB map identifies MBs that reside within the PIP region of the video frame. The PIP MB map may flag MBs that are within the PIP with a 1, and MBs outside the PIP with a 0, to readily identify MBs included in (1) and excluded from (0) the PIP. Alternatively, the PIP information may be based on a PIP MB map, but include a smaller amount of information sufficient to identify the PIP region for a remote video communication device 14. An MB is a video block that forms part of a frame. The size of the MB may be 16 by 16 pixels. However, other MB sizes are possible. Accordingly, a MB may refer to any video block, including but not limited to a macroblock as defined within a particular video coding standard such as MPEG-1, MPEG-2 and MPEG-4, ITU H.263, ITU H.264, or any other standard.

A PIP MB map may select MB boundaries that most closely conform to the coordinates of the pertinent PIP region. For example, if a PIP region crosses through an MB, the PIP MB map may place the PIP region boundary either at the outer edge or inner edge of the pertinent MB. In other words, the PIP MB map may be configured to include only MBs that are entirely within the PIP region, or also include MBs that are partially within the PIP region. In either case, the PIP MB map identifies a set of full MBs that most closely approximate the specified PIP region. Video encoder 44 or video decoder 50 operate at the MB level, and will generally require translation of the PIP region information to an MB map. By designating individual MBs as being either included in or excluded from the PIP region, the PIP MB map also may permit definition of PIP regions with irregular, or non-rectangular shapes.

Using the PIP information transmitted by local video communication device 12, remote video communication device 14 applies preferential encoding to a corresponding PIP and non-PIP regions of the incoming video, by preferential bit allocation or quantization. In particular, additional encoding bits may be allocated to the non-PIP regions, while a reduced amount of encoding bits, or zero encoding bits, may be allocated to PIP region, thereby improving image quality of the non-PIP regions of the incoming video. In this manner, local video communication device 12 is able to remotely influence video encoding by remote video communication device 14. Preferential encoding by remote video communication device 14 permits the user of local video communication device 12 to view incoming video in the non-PIP regions more clearly.

Local video communication device 12 also may apply the PIP information locally to preferentially decode regions of the incoming video. With the knowledge that (a) the PIP region of the incoming video will be obscured by the outgoing video and (b) the PIP region of the incoming video may not even be encoded if the remote video communication device 14 is PIP aware, local video communication device 12 may apply preferential decoding to apply lower complexity error concealment or post processing techniques to the PIP region of the incoming video. In this case, local video communication device 12 may apply standard or higher complexity error concealment or post processing to the non-PIP regions of the incoming video received from remote video communication device 14. Hence, PIP information may be used both locally within local video communication device 12 for preferential decoding, and remotely within remote video communication device 14 for preferential encoding.

System 10 may support video telephony according to the Session Initiated Protocol (SIP), ITU H.323 standard, ITU H.324 standard, or other standards. Each video CODEC 20, 28 generates encoded video data according to a video compression standard, such as MPEG-2, MPEG-4, ITU H.263, or ITU H.264. As further shown in FIG. 1, video CODECs 20, 28 may be integrated with respective audio CODECs 22, 30, and include appropriate MUX/DEMUX components 18, 26 to handle audio and video portions of a data stream. The MUX-DEMUX units 18, 26 may conform to the ITU H.223 multiplexer protocol, or other protocols such as the user datagram protocol (UDP).

Figure 2:
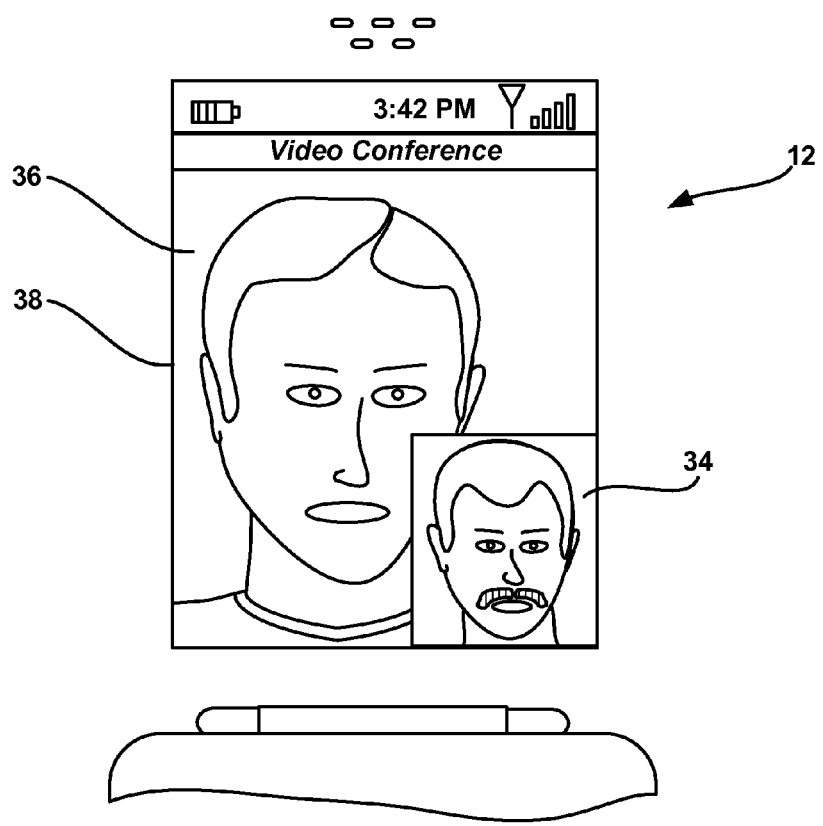
FIG. 2 is a diagram illustrating presentation of a PIP region within a video frame presented on a display associated with a wireless video communication device.

FIG. 2 is a diagram illustrating presentation of a PIP region 34 within a video frame 36 presented on a display 38 associated with a wireless video communication device 12. In the example of FIG. 2, PIP region 34 is a rectangular region that contains outgoing video to be encoded and transmitted by device 12. PIP region 34 permits a user of device 12 to view outgoing video that is transmitted to another device. Although PIP region 34 could contain any image or object, the object presented within the PIP region often will be the face, or head and shoulders, of the user of the local video communication device 12. The user is a person who is party to a videoconference with a user of another wired or wireless video communication device.

PIP region 34 covers a small region of the incoming video presented within video frame 36. For example, PIP region 34 may cover approximately twenty to twenty-five percent of video frame 36. The size, shape and position of PIP region 34 may be fixed or adjustable, and may be defined, described or adjusted in a variety of ways, either manually or automatically. The content of PIP region 34 presented on local video communication device 12 for local viewing purposes also are encoded and transmitted as outgoing video from local video communication device 40 to a remote video communication device 14. Remote video communication device 14 then presents the outgoing video received from local video communication device within a full size video frame. Likewise, local video communication device 12 receives incoming video for presentation at full size within video frame 36 with PIP region 34.

The content of PIP region 34 may be captured by a video capture device associated with local video communication device 12. Alternatively, the content of PIP region 34 may be produced from a video archive. For example, instead of locally captured video, PIP region 34 may contain an informational overlay, such as an advertisement, call status, network status, or other graphic or textual information. In either case, PIP information defining the position and size of PIP region 34 aids remote video communication device 14 in preferentially encoding non-PIP covered regions of incoming video transmitted to local video communication device 12.

Figure 3:
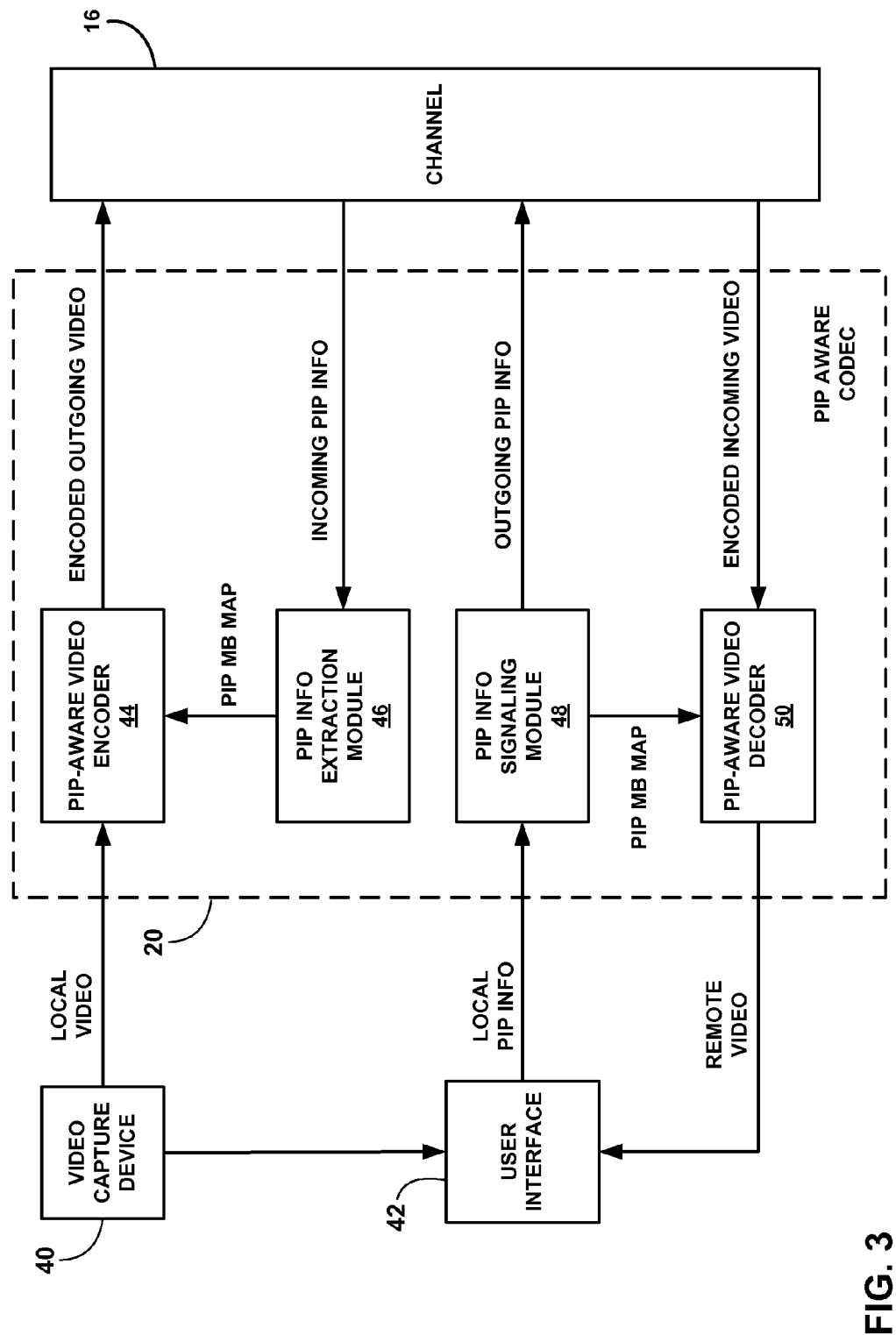
FIG. 3 is a block diagram illustrating a video communication device incorporating a PIP-aware CODEC.

FIG. 3 is a block diagram illustrating a video communication device 12 incorporating a PIP-aware CODEC 20. Although FIG. 3 depicts video communication device 12 of FIG. 1, video communication device 14 may be similarly constructed. Video communication device 12 or 14 may function as a recipient and sender device to support video telephony. However, operation will be described from the perspective of video communication device 12 as a recipient of incoming video and a sender of outgoing video, for purposes of illustration. As shown in FIG. 3, video communication device 12 includes PIP-aware CODEC 20, a video capture device 40, and a user interface 42. Although communication channel 16 is shown in FIG. 3, MUX-DEMUX and audio components are omitted for ease of illustration. Video capture device 40 may be a video camera integrated with, or operably coupled to, video communication device 12. In some embodiments, for example, video capture device 40 may be integrated with a mobile telephone to form a so-called video camera phone or video phone. In this manner, video capture device 40 supports mobile VT applications.

User interface 42 may include a display device, such as a liquid crystal display (LCD), a plasma screen, projector display, or any other display apparatus, which may be integrated with, or operably coupled to, video communication device 12. The display device presents video imagery to a user of video communication device 12. The video imagery may include outgoing video obtained locally by video capture device 40, and presented in PIP region 34. The video imagery also may include incoming video received from remote video communication device 14. In addition, user interface 42 may include any of a variety of user input media, including hard keys, soft keys, various pointing devices, styli, and the like, for entry of information by a user of video communication device 12. In some embodiments, the display device and user input media of user interface 42 may be integrated with a mobile telephone. A user of video communication device 12 relies on user interface 42 to view incoming video and outgoing video in PIP region 34. In addition, the user may rely on user interface 42 to enter information for definition of the size, shape or position of PIP region 34.

As further shown in FIG. 3, PIP-aware CODEC 20 includes PIP-aware video encoder 44, PIP info extraction module 46, PIP information signaling module 48, and PIP-aware video decoder 50. PIP-aware video encoder 44 encodes locally generated video ("LOCAL VIDEO") obtained from video capture device 40 for transmission to a remote recipient device. The term "local" designates video that is generated locally within video communication device 12, in contrast to "remote" video that is received from a remote video communication device, such as video communication device 14. In the example of FIG. 3, PIP-aware video encoder 44 uses PIP information obtained from remote video communication device 14 to preferentially encode the local video, and produces outgoing video ("ENCODED OUTGOING VIDEO") for transmission to remote video communication device 14 via channel 16.

PIP information extraction module 46 receives incoming PIP information ("INCOMING PIP INFO") from remote video communication device 14. The incoming PIP information may be received by either in-band signaling or out-of-band signaling. With in-band signaling, the incoming PIP information may be embedded within the incoming video bitstream. In this case, PIP information extraction module 46 may operate in coordination with PIP-aware video decoder 50 to seek the PIP information within the decoded incoming video. With out-of-band signaling, the incoming PIP information may be transmitted separately from the incoming video bitstream, e.g., by real time transport control protocol (RTCP) reporting, ITU H.245 protocol messaging or session initiation protocol (SIP) messaging. The incoming PIP information may define the size and position of the PIP region presented to a user of remote video communication device 14, unless a default size and position is known to be applicable.

In the case of in-band signaling, as mentioned above, the PIP information may be embedded within the encoded video bitstream that is received from remote video communication device 14. In the MPEG4 bitstream format, for example, there is a field called "user_data" that can be used to embed information that describes the bitstream. The "user_data" field, or a similar field in other bitstream formats, may be used to embed PIP information without violating bitstream compliance. Alternatively, the PIP information may be embedded within the video bitstream by so-called data hiding techniques, such as steganography. In either case, PIP information extraction module 46 may be configured to seek the PIP information in the user_data field or elsewhere within the incoming video from the remote device 14.

The incoming PIP information may define the PIP region in terms of coordinates or macroblocks (MBs) within a video frame that fall inside of the PIP region. Alternatively, the incoming PIP information may merely indicate that the PIP feature has been activated, and that a default size and position for the PIP region should be assumed. Based on the incoming PIP information, in the example of FIG. 3, PIP information extraction module 46 generates a PIP MB map that identifies MBs that fall within the PIP region of the remote video communication device 14. For example, as discussed previously, the PIP information may flag MBs as being covered by a PIP region or not covered by the PIP region.

Using the PIP MB map, PIP-aware video encoder 44 preferentially encodes regions of the local video that are not within the PIP region identified by the PIP MB map. For example, PIP MB map may direct PIP-aware video encoder 44 to force MBs to be non-coded if they reside within the PIP region. In this manner, the bits that would have been spent on coding motion vectors and texture bits can instead be saved to encode those MBs that are identified by the PIP MB map as being within the PIP region. The result is improved video quality in the non-PIP regions, i.e., the regions of the video frame that are not overlaid with PIP content.

Preferential encoding may involve weighted allocation of encoding bits between regions of the local video that are inside the PIP region and regions of the local video that are outside the PIP region. However, regions of the local video that are inside the PIP region will be completely obscured. Therefore, it is more preferable to skip encoding of MBs of the local video that fall within the PIP region. In either case, the bits that ordinarily would be used for the local video obscured by the PIP region can instead be used for the remainder of the local video, thereby improving visual quality for the visible regions of the local video.

Remote video communication device 14 may include reciprocal functionality, i.e., a PIP-aware CODEC. To transmit PIP information to remote video communication device 14, local video communication device 12 includes PIP information signaling module 48. PIP information signaling module 48 may receive local PIP information ("LOCAL PIP INFO") from user interface 42, and generates outgoing PIP information ("OUTGOING PIP INFO") for transmission to remote video communication device 14 via channel 16. PIP information signaling module 48 may be automatically activated when the user activates the PIP feature. Like incoming PIP information, the outgoing PIP information provided to remote video communication device 14 may be transmitted via in-band or out-of-band signaling. In the case of in-band signaling, PIP information signaling module 48 may operate in coordination with PIP-aware video encoder 44 to place the outgoing PIP information in the encoded outgoing video bitstream.

Outgoing PIP information, like incoming PIP information, may define the position and size of a PIP region. However, outgoing PIP information is directed to the PIP region presented by local video communication device 12. The PIP region presented by local video communication device 12 covers a small portion of the incoming video received from remote video communication device 14. Using the outgoing PIP information, remote video communication device 14 applies preferential encoding to encoded incoming video ("ENCODED INCOMING VIDEO") received by PIP-aware video decoder 50. In this manner, the visual quality of the portion of the incoming video that is visible to the user of local video communication device 12 can be improved.

Optionally, outgoing PIP information also may be provided to PIP-aware video decoder 50 for use in preferential decoding of non-PIP regions of the encoded incoming video. For example, in addition to transmitting outgoing PIP information to remote video communication device 14, PIP information signaling module 48 may provide a PIP MB map to PIP-aware video decoder 50. The PIP MB map identifies the MBs within the incoming video that will be covered or obscured by the locally presented PIP region. PIP-aware video decoder 50 uses the PIP MB map to preferentially decode regions of the incoming video that are not inside the PIP region. In particular, PIP-aware video decoder 50 may apply higher quality error concealment or post processing techniques to the non-PIP regions of the incoming video, or entirely skip error concealment or post processing for regions of the incoming video that will be covered by the locally presented PIP region. In general, PIP-aware video decoder 50 applies better error concealment or post-processing to non-PIP MBs than to PIP MBs of the incoming video. In some cases, the decoding, error concealment or post-processing of PIP MBs is skipped altogether.

Incoming PIP information and outgoing PIP information may be exchanged between local video communication device 12 and remote video communication device 14 on a periodic or intermittent basis. In the case of in-band signaling, for example, PIP information may be embedded in every frame or selected frames on a periodic basis. Alternatively, for out-of-band signaling, PIP information may be sent by periodic or intermittent messages. However, the size and position of the PIP region may be fixed or may change relatively infrequently. Accordingly, for bandwidth and processing efficiency, it may be desirable to send PIP information relatively infrequently or only when there is a change in the size or position of the pertinent PIP region.

According to some embodiments, video communication devices 12, 14 may be configured to assume a fixed, default PIP region until a change in the size or position of the PIP region, if permitted, is made. As a further consideration, the PIP feature may not always be activated. The PIP information may simply include an indication of whether the PIP feature is activated, which may be sent periodically or at the time of activation. If the PIP region is fixed, the PIP information may only include the indication of PIP feature activation. If the PIP region is adjustable, the PIP information may include the indication of PIP feature activation plus applicable size and position information for the PIP region. In any event, the PIP information permits a video communication device 12, 14 to preferentially encode non-PIP regions of video to enhanced visual quality.

PIP-aware video encoder 44, PIP information extraction module 46, PIP information signaling module 48, and PIP-aware video decoder 50 may be formed in a variety of ways, as discrete functional modules or as a monolithic module that encompasses the functionality ascribed to each module. In any event, the various components of PIP-aware CODEC 20 may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry. If implemented in software, the techniques may be realized in part by a computer readable medium comprising program code containing instructions that, when executed in a processor such as a DSP, performs one or more of the methods described herein.

Figure 4:
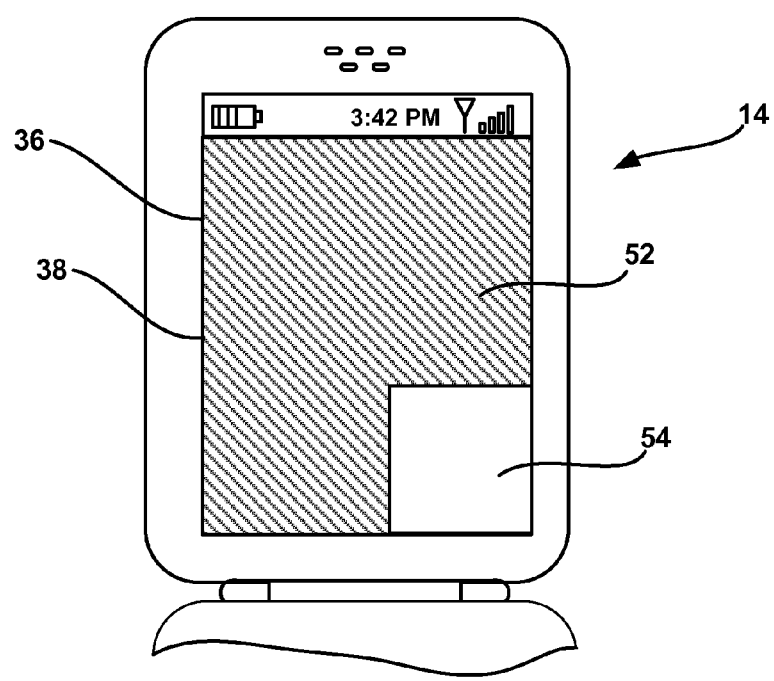
FIG. 4 is a diagram illustrating PIP and non-PIP regions within a video frame presented to a user.

FIG. 4 is a diagram illustrating PIP and non-PIP regions of incoming video within a video frame presented to a user. In the example of FIG. 4, a frame 36 of outgoing video presented on a display 38 includes a non-PIP covered region 52 that will not be covered by PIP content at the remote video communication device 14, and a PIP covered region 54 that will be covered by the PIP content. Using PIP information that indicates the position and size of the PIP content generated by the remote video communication device 14, PIP-aware video encoder 46 of local video communication device 12 applies preferential encoding to non-PIP region 52. Again, the PIP information may include a PIP MB map. PIP-aware video encoder 46 recaptures the encoding bits that ordinarily would be used to encode MBs within PIP-covered region 54. Instead of being wasted, the recaptured bits can be used to encode MBs within non-PIP covered region 52 to achieve greater visual quality. The PIP-covered region 54 may be encoded with lower quality or completely skipped. Skipping of encoding will typically be preferred if the PIP content completely obscures PIP-covered region 54. If the PIP content is presented in a semi-opaque manner, then low quality encoding of PIP-covered region 54 may be desired.

Figure 5:
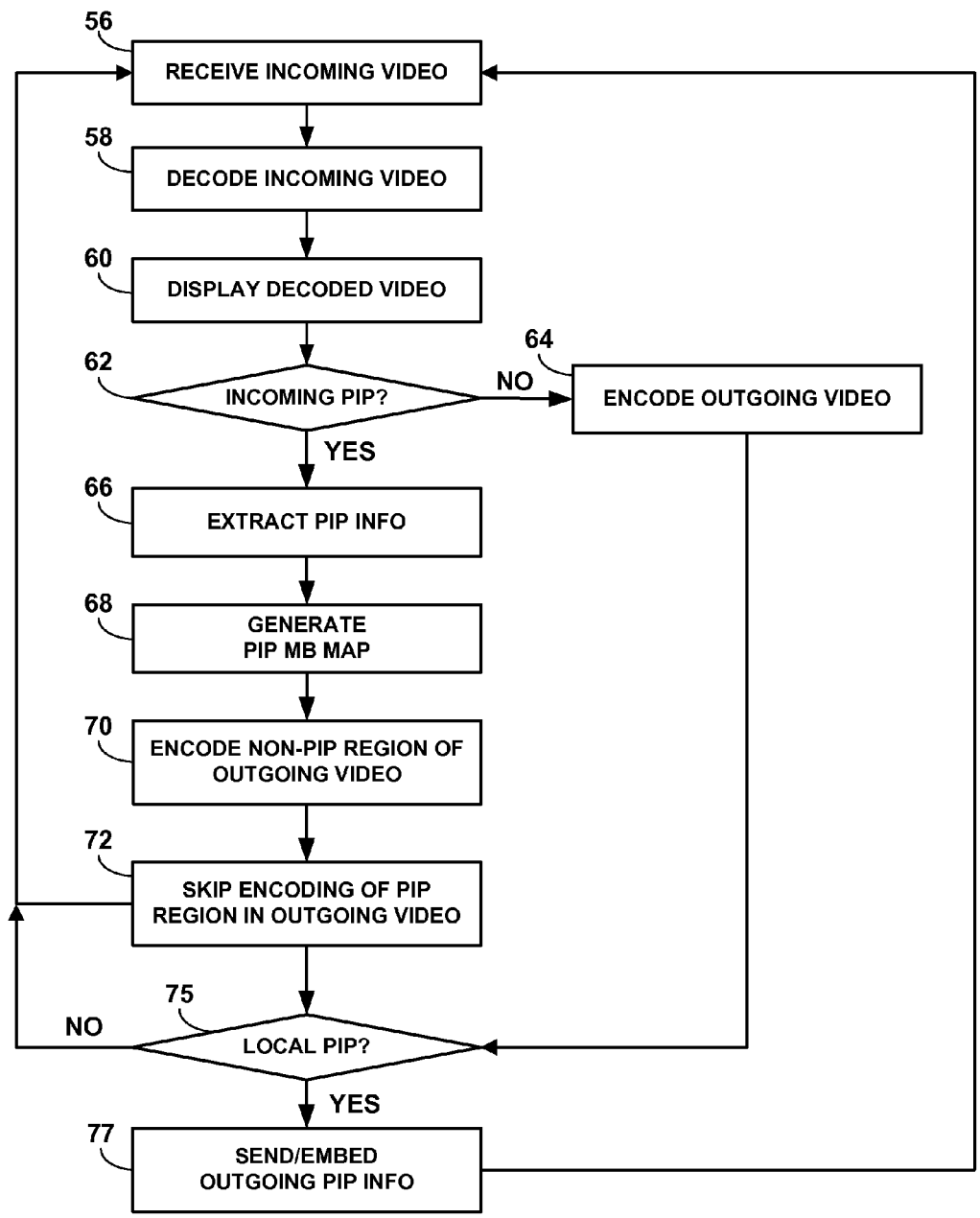
FIG. 5 is a flow diagram illustrating processing of PIP information to preferentially encode non-PIP regions of outgoing video.

FIG. 5 is a flow diagram illustrating processing of PIP information to preferentially encode non-PIP covered regions of outgoing video. The operations shown in FIG. 5 will be described with reference to components shown in FIG. 3. As shown in FIG. 5, upon receipt of incoming video (56), PIP-aware video decoder 50 decodes the incoming video (58). A display associated with user interface 42 then displays the decoded video to the user of local video communication device 12 (60).

PIP information extraction module 50 seeks incoming PIP information, either in-band within the incoming video bitstream or out-of-band via a signaling protocol. If no incoming PIP information is available (62), PIP information extraction module 48 notifies PIP-aware video encoder 46. In this case, PIP-aware video encoder 46 encodes each frame of outgoing video (64) in its entirety, without preferential encoding. If incoming PIP information is available, PIP information extraction module 48 extracts the PIP information (66) and generates a PIP MB map (68) that identifies MBs that will be covered by a remote PIP region.

Using the PIP MB map, PIP-aware video encoder 46 encodes the non-PIP covered region of the outgoing video (70) and skips encoding of the PIP covered region of the outgoing video (72). The encoding bits that ordinarily would be used in the PIP-covered region of the outgoing video are instead used to encode the non-PIP covered region of the outgoing video, thereby enhancing visual quality. Once preferential encoding of the outgoing video is completed for a frame, PIP information signaling module 48 determines whether local video communication device 12 has specified local PIP information (75). If so, PIP information signaling module 48 embeds PIP information within the outgoing video, or otherwise sends the PIP information to remote video communication device 14 (77). If no local PIP is specified, the process continues to the next frame.

Incoming and outgoing PIP information may be provided on a frame-by-frame basis, a periodic basis, or an intermittent basis. Once incoming PIP information is obtained, it may continue to be used by local video communication device 12 to encode outgoing video until remote video communication device 14 indicates otherwise. Alternatively, PIP info extraction module 50 may receive incoming PIP information for each frame that is processed, i.e., each loop iteration, as shown in the example of FIG. 5. Ordinarily, the PIP boundaries may fall across MB boundaries. In some embodiments, if PIP boundaries bisect MBs, the MBs can be considered as being included in or excluded from the PIP region, depending on design preferences.

Figure 6:
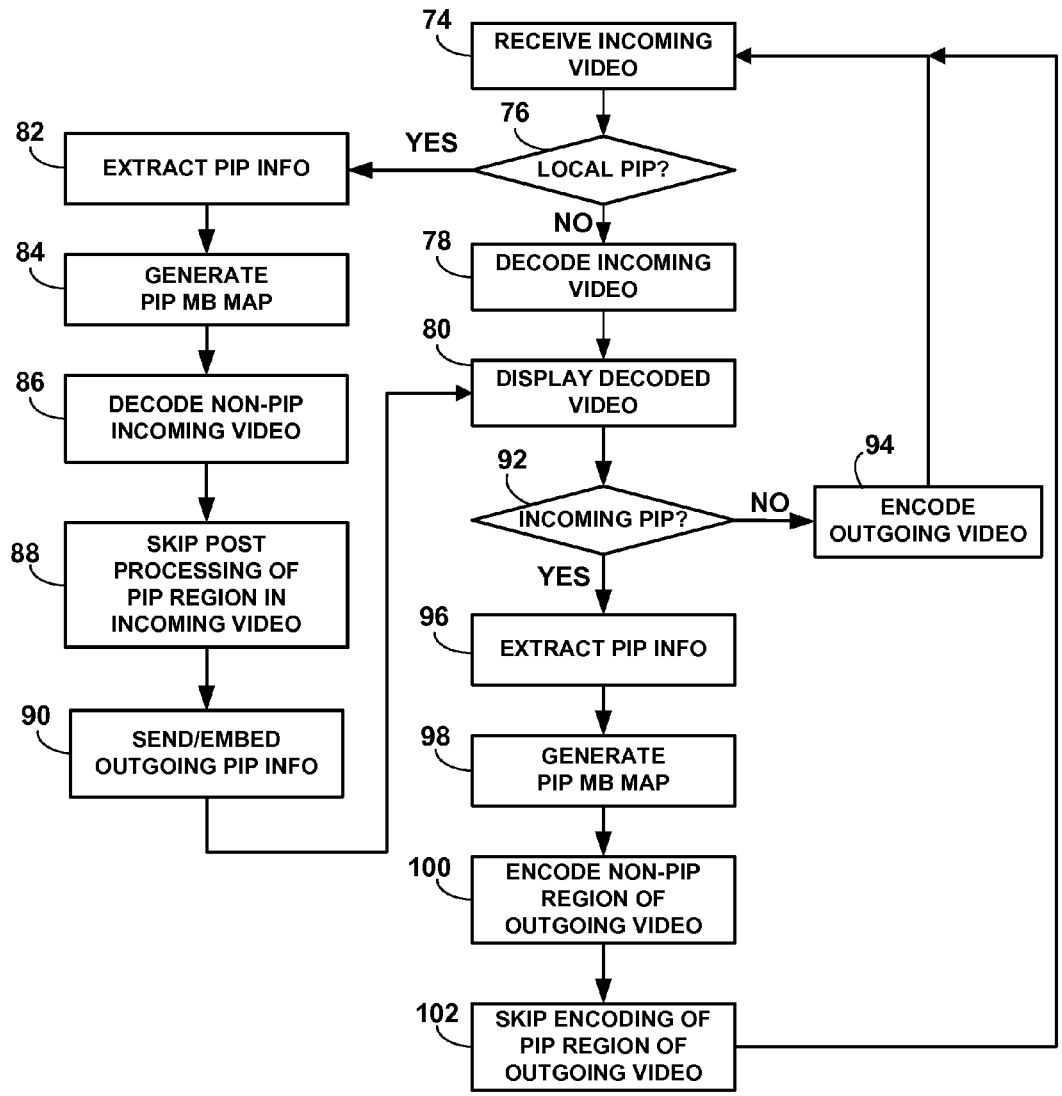
FIG. 6 is a flow diagram illustrating processing of PIP information to preferentially encode non-PIP regions of outgoing video and preferentially decode non-PIP regions of incoming video.

FIG. 6 is a flow diagram illustrating processing of PIP information to preferentially encode non-PIP covered regions of outgoing video and preferentially decode non-PIP covered regions of incoming video. The operations shown in FIG. 6 will be described with reference to components shown in FIG. 3. As shown in FIG. 6, upon receipt of incoming video (74), PIP information signaling module 48 determines whether local video communication device 12 has specified local PIP information (76). If so, the local PIP information is transmitted to remote video communication device 14 as outgoing PIP information, as will be described. In addition, the local PIP information may be used in the decoding of incoming video, with the knowledge that a portion of the incoming video will be obscured by the local PIP region.

If no local PIP is specified (76), PIP-aware video decoder 50 decodes the incoming video (78) without any preferential decoding, and user interface 42 displays the decoded video (80). If a local PIP is specified (76), however, PIP information extraction module 46 extracts PIP information from the local PIP information (82) and generates a PIP MB map (84) for use by PIP-aware video decoder 50 in decoding the incoming video received from remote video communication device 14. In particular, PIP-aware video decoder 50 decodes the non-PIP covered region of the incoming video (86), e.g., using standard error concealment and post processing. Using the PIP MB map, however, PIP-aware video decoder 50 skips error concealment and post processing, or applies lower quality error concealment and post processing, for the PIP-covered region of the incoming video (88). PIP information signaling module 48 then sends or embeds outgoing PIP information for use by remote video communication device 14 (90), and the decoded video is displayed by user interface 42 (80).

Skipping of decoding for the PIP-covered area of the incoming video makes sense because the local PIP region will obscure that area. If the remote video communication device 14 is PIP-aware, the PIP-covered area of the incoming video will not even be encoded anyway. However, preferential decoding may also be applied when local video communication device 12 is receiving incoming video from a remote video communication device that is not PIP-aware. Hence, PIP-aware processing may be applied to encoding of outgoing video based on remote PIP information for the device that receives the outgoing video, decoding of incoming video based on local PIP information for the device that receives the incoming video, or both. PIP-aware processing can be used by one or both devices that are party to a videoconference in which a PIP is presented, at either end of the videoconference.

As further shown in FIG. 6, PIP information extraction module 46 determines whether incoming PIP information has been transmitted by remote video communication device 14 (92), either by in-band or out-of-band signaling. If not, PIP information extraction module 46 either does not provide a PIP MB map to PIP-aware video encoder 44, or the PIP MB map indicates a PIP region of zero area. In either case, the outgoing video is encoded (94) in its entirety without preferential encoding of PIP-covered and non-PIP covered regions. If incoming PIP information is available (92), however, PIP information extraction module 46 extracts the PIP information (96) and generates a PIP MB map (98) for use by PIP-aware video encoder 44. Extraction may involve translation of coordinates or other values to identify MBs, within a video frame, that are covered by a PIP region. PIP-aware video encoder 44 uses the PIP MB map to encode a non-PIP covered region of the outgoing video (100), and skips encoding of a PIP-covered region of the outing video (102).

Figure 7:
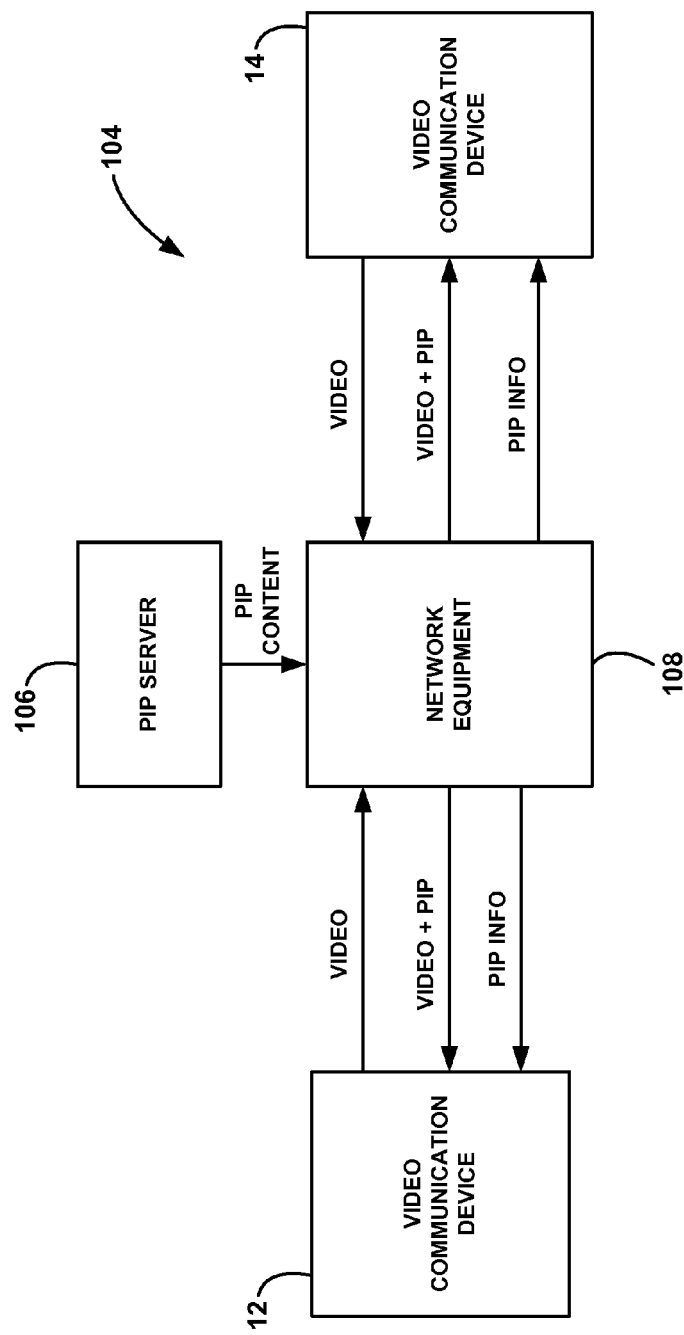
FIG. 7 is a block diagram illustrating a video encoding and decoding system in which PIP content and information is provided by an intermediate network server.

FIG. 7 is a block diagram illustrating a video encoding and decoding system 104 in which PIP content and information is provided by an intermediate network server 106. In this disclosure, PIP content has been generally described as content produced by a video communication device 12, 14, such as outgoing video. However, the PIP content may include other information as an alternative or in addition to outgoing video. For example, textual or graphic information conveying information, such as time, date, elapsed video conference time, network status, and the like, may be presented in the PIP region. Such information may be locally generated within a video communication device 12, 14. Alternatively, such PIP content may be generated by an intermediate PIP server 106. In this case, network infrastructure equipment 108 in communication with PIP server 106 may be provided to add the PIP content to encoded video transmitted between video communication devices 12, 14.

To that end, network equipment 108 may include encoder and decoder components sufficient to permit placement of the PIP content within the video stream. Alternatively, the PIP content may be sent from network equipment 108 to respective video communication devices 12, 14 and placed within decoded video. As an alternative to status information, PIP content provided by PIP server 106 may include advertising information for commercial products or services, or informational public services messages. Indeed, PIP content is not limited to any particular type of content, and my include video of the sender, advertisements, public or private information, or any content that is presented as an overlay on a portion of decoded video. In any case, the PIP content produced by PIP server 106 is displayed in a PIP region that is overlaid on a portion of the decoded video. Consequently, a portion of the decoded video is obscured by the PIP region, making preferential encoding or decoding, as described herein, desirable. To support preferential encoding, decoding, or both, network equipment 108 receives video from local video communication device 12, adds PIP content from PIP server 106, and sends the video and the PIP content to remote video communication device 14.

In addition, network equipment 108 sends PIP information specifying the size and position of a PIP region, either by in-band or out-of-band signaling, to remote video communication device 14 for use in preferential encoding or decoding of video that it not covered by the PIP region. As is apparent from FIG. 7, network equipment 108 may operate reciprocally for local and remote video communication devices 12, 14. In particular, network equipment 108 provides video from video communication device 12 and PIP content from PIP server 106 to video communication device 14, along with PIP information. Similarly, network equipment 108 provides video from video communication device 14 and PIP content from PIP server 106 to video communication device 12, along with PIP information. The PIP content, as well as the size and position of the PIP content, may be the same or different for video communication devices 12, 14.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware units configured for encoding and decoding, or incorporated in a combined video encoder-decoder (CODEC).

Various embodiments have been described. These and other embodiments are within the scope of the following claims.

The invention claimed is:

1. A method comprising:
   encoding video to be transmitted to a remote video communication device based on remote picture-in-picture (PIP) information, wherein encoding includes preferentially encoding regions of the video that are not covered by a remote PIP region, and wherein preferentially encoding includes skipping encoding of regions of the video that are covered by the remote PIP region; and
   transmitting the video and PIP information to the remote video communication device.

2. The method of claim 1, further comprising receiving the remote PIP information from the remote video communication device.

3. The method of claim 1, wherein the remote PIP information indicates a size and a position of the remote PIP region presented by the remote video communication device.

4. The method of claim 1, wherein preferentially encoding includes encoding the regions of the video that are not covered by the remote PIP region with higher quality than regions of the video that are covered by the remote PIP region.

5. The method of claim 1, wherein preferentially encoding includes encoding the regions of the video that are not covered by the remote PIP region with additional encoding bits that would otherwise be used to encode the regions of the video that are covered by the remote PIP region.

6. The method of claim 1, further comprising:
   receiving encoded video from the remote video communication device;
   decoding the encoded video based on the PIP information; and
   presenting the decoded video at a local video communication device.

7. The method of claim 6, wherein the PIP information indicates a size and a position of a local PIP region presented by the local video communication device.

8. The method of claim 7, wherein decoding includes preferentially decoding regions of the received video that are not covered by the local PIP region.

9. The method of claim 8, wherein preferentially decoding includes skipping at least one of error concealment or post processing for regions of the received video that are covered by the local PIP region.

10. The method of claim 1, wherein encoding video includes encoding the video in a local video communication device, and wherein at least one of the local video communication device or the remote video communication device includes a mobile wireless device participating in video telephony.

11. A video communication device comprising:
   an encoder that encodes video to be transmitted to a remote video communication device based on remote picture-in-picture (PIP) information, wherein the encoder preferentially encodes regions of the video that are not covered by a remote PIP region, and wherein the preferentially encoding includes the encoder skipping encoding of regions of the video that are covered by the remote PIP region; and
   a signaling module that sends PIP information to the remote video communication device.

12. The video communication device of claim 11, further comprising a module that receives the remote PIP information from the remote video communication device.

13. The video communication device of claim 11, wherein the remote PIP information indicates a size and a position of the remote PIP region presented by the remote video communication device.

14. The video communication device of claim 11, wherein the encoder preferentially encoding includes the encoder encoding the regions of the video that are not covered by the remote PIP region with higher quality than regions of the video that are covered by the remote PIP region.

15. The video communication device of claim 11, wherein the encoder preferentially encoding includes the encoder encoding the regions of the video that are not covered by the remote PIP region with additional encoding bits that would otherwise be used to encode the regions of the video that are covered by the remote PIP region.

16. The video communication device of claim 11, further comprising:
   a module that receives encoded video from the remote video communication device; and
   a decoder that decodes the encoded video based on the PIP information, and presents the decoded video.

17. The video communication device of claim 16, wherein the PIP information indicates a size and a position of a local PIP region presented by the video communication device.

18. The video communication device of claim 17, wherein the decoder decoding includes the decoder preferentially decoding regions of the received video that are not covered by the local PIP region.

19. The video communication device of claim 18, wherein the decoder preferentially decoding includes the decoder skipping at least one of error concealment or post processing for regions of the received video that are covered by the local PIP region.

20. The video communication device of claim 11, wherein at least one of the video communication device or the remote video communication device includes a mobile wireless device participating in video telephony.

21. A computer program product, the computer program product including a non-transitory computer readable medium storing computer-executable instructions that when executed cause a processor to:
   encode video to be transmitted to a remote video communication device based on remote picture-in-picture (PIP) information, wherein the instructions that cause the processor to encode include instructions that cause the processor to preferentially encode regions of the video that are not covered by a remote PIP region, and further wherein the instructions that cause the processor to preferentially encode include instructions that cause the processor to skip encoding of regions of the video that are covered by the remote PIP region; and transmit the video and PIP information to the remote video communication device.

22. The computer program product of claim 21, further comprising instructions that cause the processor to receive the remote PIP information from the remote video communication device.

23. The computer program product of claim 21, wherein the remote PIP information indicates a size and a position of the remote PIP region presented by the remote video communication device.

24. The computer program product of claim 21, wherein the instructions that cause the processor to preferentially encode include instructions that cause the processor to encode the regions of the video that are not covered by the remote PIP region with higher quality than regions of the video that are covered by the remote PIP region.

25. The computer program product of claim 21, wherein the instructions that cause the processor to preferentially encode include instructions that cause the processor to encode the regions of the video that are not covered by the remote PIP region with additional encoding bits that would otherwise be used to encode the regions of the video that are covered by the remote PIP region.

26. The computer program product of claim 21, further comprising instructions that cause the processor to:
    receive encoded video from the remote video communication device;
    decode the encoded video based on the PIP information; and
    present the decoded video at a local video communication device.

27. The computer program product of claim 26, wherein the PIP information indicates a size and a position of a local PIP region presented by the local video communication device.

28. The computer program product of claim 27, wherein the instructions that cause the processor to decode include instructions that cause the processor to preferentially decode regions of the received video that are not covered by the local PIP region.

29. The computer program product of claim 21, wherein the processor is part of a local video communication device, and wherein at least one of the local video communication device or the remote video communication device includes a mobile wireless device participating in video telephony.

30. A system comprising:
    means for encoding video to be transmitted to a remote video communication device based on remote picture-in-picture (PIP) information, wherein the means for encoding preferentially encodes regions of the video that are not covered by a remote PIP region, and wherein preferentially encoding includes skipping encoding of regions of the video that are covered by the remote PIP region; and
    means for transmitting the video and PIP information to the remote video communication device.

31. The system of claim 30, further comprising means for receiving the remote PIP information from the remote video communication device.

32. The system of claim 30, wherein the remote PIP information indicates a size and a position of the remote PIP region presented by the remote video communication device.

33. The system of claim 30, wherein preferentially encoding includes encoding the regions of the video that are not covered by the remote PIP region with higher quality than regions of the video that are covered by the remote PIP region.

34. The system of claim 30, wherein preferentially encoding includes encoding the regions of the video that are not covered by the remote PIP region with additional encoding bits that would otherwise be used to encode the regions of the video that are covered by the remote PIP region.

35. The system of claim 30, further comprising:
    means for receiving encoded video from the remote video communication device;
    means for decoding the encoded video based on the PIP information; and
    means for presenting the decoded video at a local video communication device.

36. The system of claim 35, wherein the PIP information indicates a size and a position of a local PIP region presented by the local video communication device.

37. The system of claim 36, wherein the means for decoding preferentially decodes regions of the received video that are not covered by the local PIP region.

38. The system of claim 30, wherein the means for encoding video encodes the video in a local video communication device, and wherein at least one of the local video communication device or the remote video communication device includes a mobile wireless device participating in video telephony.

* * * * *